(12) United States Patent
Beach

(10) Patent No.: US 9,307,835 B2
(45) Date of Patent: Apr. 12, 2016

(54) MATERIALS AND METHODS FOR A WAREHOUSE STORAGE SYSTEM

(71) Applicant: Daniel F. Beach, Dakota, MN (US)

(72) Inventor: Daniel F. Beach, Dakota, MN (US)

(73) Assignee: Jim's Welding & Fabricating, LLC, Dakota, MN (US)

( * ) Notice: Subject to any disclaimer, the term of this patent is extended or adjusted under 35 U.S.C. 154(b) by 101 days.

(21) Appl. No.: 13/946,030

(22) Filed: Jul. 19, 2013

(65) Prior Publication Data

US 2014/0305893 A1     Oct. 16, 2014

Related U.S. Application Data

(60) Provisional application No. 61/811,528, filed on Apr. 12, 2013.

(51) Int. Cl.
| | |
|---|---|
| A47G 29/00 | (2006.01) |
| A47B 55/00 | (2006.01) |
| A47B 96/04 | (2006.01) |
| B65G 1/02 | (2006.01) |

(52) U.S. Cl.
CPC ............... *A47B 55/00* (2013.01); *A47B 96/04* (2013.01); *B65G 1/02* (2013.01)

(58) Field of Classification Search
CPC ...... A47B 96/04; A47B 57/58; A47B 57/581; A47B 57/583; A47B 57/585; A47B 57/586; A47B 57/588; A47B 55/00; B65G 1/02
USPC ................................................ 211/71.01, 183
See application file for complete search history.

(56) References Cited

U.S. PATENT DOCUMENTS

| | | | |
|---|---|---|---|
| 3,221,894 A * | 12/1965 | Knuth | 211/134 |
| 3,272,345 A * | 9/1966 | Wallace | 211/44 |
| 3,330,583 A | 7/1967 | Kennedy et al. | |
| 3,625,372 A | 12/1971 | MacKenzie | |
| 4,074,812 A | 2/1978 | Skubic et al. | |
| 4,074,814 A | 2/1978 | Cooper et al. | |
| 4,760,682 A | 8/1988 | King | |
| 4,801,026 A | 1/1989 | Andersson | |
| 4,815,613 A | 3/1989 | Hollander | |
| 4,901,867 A * | 2/1990 | Petty, Jr. | 211/46 |
| 5,257,794 A * | 11/1993 | Nakamura | 280/79.3 |
| 5,624,045 A | 4/1997 | Highsmith et al. | |
| 5,713,367 A | 2/1998 | Arnold et al. | |
| 5,938,367 A | 8/1999 | Olson | |
| 6,155,441 A | 12/2000 | Andersen et al. | |
| 6,203,234 B1 | 3/2001 | Olson | |
| 6,230,910 B1 | 5/2001 | Olsson et al. | |
| 6,352,164 B1 | 3/2002 | Hyatte et al. | |
| 6,978,906 B2 * | 12/2005 | Wishart et al. | 211/189 |
| 7,757,870 B2 * | 7/2010 | Lin et al. | 211/118 |
| 2004/0256341 A1 * | 12/2004 | Donnell et al. | 211/187 |
| 2005/0230338 A1 * | 10/2005 | Farinola et al. | 211/186 |
| 2013/0306583 A1 * | 11/2013 | Caldwell | 211/181.1 |

* cited by examiner

*Primary Examiner* — Korie H Chan
(74) *Attorney, Agent, or Firm* — Patterson Thuente Pedersen, P.A.

(57) ABSTRACT

A warehouse storage system having a pallet rack unit partitioned into compartments, the pallet rack unit defined by interior area between two vertical upright units operably connected by a first pair and a second pair of horizontal support beams that span a longitudinal distance between the vertical upright units. The pallet rack unit partitioned into compartments by a vertical backing divider that spans at least a portion of the longitudinal distance, which is operably connected to one or more divider panels that operably connect to at least one of the horizontal support beams.

20 Claims, 2 Drawing Sheets

MATERIALS AND METHODS FOR A WAREHOUSE STORAGE SYSTEM

PRIORITY CLAIM

This application claims priority from U.S. Provisional Application No. 61/811,528, filed Apr. 12, 2013, the disclosure of which is hereby incorporated by referenced in its entirety.

FIELD OF THE INVENTION

The present invention relates generally to the field of warehouse storage. Specifically, the present invention relates to the materials and methods for a warehouse storage system for partitioning pallet racks that enhances organization and facilitates greater operational efficiency.

BACKGROUND OF THE INVENTION

For many businesses, there is a need to store inventory in a manner that protects it, organizes it, and facilitates convenient removal and restocking. Many businesses store their inventory on pallets that are further organized in pallet racks.

Pallets are flat transport structures that support goods when they are being transported or stored. Such transport and subsequent storage of the pallets is typically accomplished using a forklift, pallet jack, front loader, or other jacking device. A pallet is the structural foundation of a unit load which improves handling and storage efficiencies. Goods or shipping containers are often placed on a pallet and secured with strapping, stretch wrap or shrink wrap before being transported. While most pallets are wooden, pallets can also be made of plastic, metal, and paper.

Pallet racks are a material handling storage aid system designed to store materials on a pallet. While there are many varieties of pallet racking, essentially all types of pallet racks allow for the storage of palletized materials in horizontal rows with multiple levels. Often, the pallet racks have individual units defined by at least two vertical uprights and one or more horizontal beams. Typically, the pallet racking contains at least two upright vertical supports or frames that are connected by at least two horizontal beams that span the distance between the upright frames. The upright frames may contain diagonal bracing and/or horizontal bracing that is usually welded between two upright columns to form the upright frame. Some pallet racking also contains wire decking, which is commonly used as a safety measure to prevent pallets or the products stored on them from falling through the rack structure.

An example of an adjustable rack system having a first vertical upright unit and a second vertical upright unit, each of the first and second vertical upright units having two spaced apart columns with a plurality of teardrop shaped slots for receiving a beam that spans a longitudinal distance between the first and second vertical uprights is disclosed in U.S. Pat. No. 6,352,164 for a "Storage Rack Having Locking Beam-To-Column Connection", the disclosure of which is incorporated by reference in its entirety. Other examples of a pallet rack is shown in U.S. Pat. No. 4,760,682 for a "Tubular Rack Beam and Method of Making Same", U.S. Pat. No. 4,074,812 for a "Pallet Rack", U.S. Pat. No. 4,815,613 for a "Roll-Through Storage Rack, a Girder and a Retaining Plate Therefor"; U.S. Pat. No. 4,801,026 for a "Device in a Storage Rack"; and U.S. Pat. No. 3,625,372 issued Dec. 7, 1971 for a "Pallet Rack", all of which are incorporated herein by reference in their entirety.

Many prior patents disclose a latching or locking device at beam-to-column connections in storage racks. One example is disclosed in U.S. Pat. Nos. 5,624,045 and 5,713,367, in which the fasteners are described as connecting pins and the disclosures of which are incorporated herein by reference. Other examples, which employ spring-biased pins, are disclosed in U.S. Pat. No. 3,330,583, in U.S. Pat. No. 4,074,814, the disclosure of which is incorporated herein by reference, and in U.S. Pat. Nos. 5,938,367 and 6,203,234, 6,155,441, 6,230,910, and 6,352,164, the disclosure of which is incorporated herein by reference.

When not being transported, pallets loaded with goods are typically placed and stacked on shelving units or pallet racks that can hold the weight of many fully loaded pallets. Organizing the goods in such a manner enables a business to make more efficient use of warehouse space, thus save money spent on storing their inventory.

Generally, since up to three or four or more pallets can be stacked on one another in rapid succession within a single pallet rack unit, a business can save significant time and money not having to unload and organize the goods immediately after transport. Also, pallet racks can be constructed to have two or more pallet rack units in the vertical direction, such that a pallet or stacked pallets may be located quite a distance off of the ground. Further, pallet racks can be constructed to have two or more pallet rack units in the horizontal direction, such that different pallets or stacked pallets with different product can be stored on the same pallet rack system.

Current pallet racks systems do not facilitate the convenient organization, or the removal and restocking of goods, when partial pallets are sold or stocked or otherwise need to be transported. Moreover, many current pallet rack systems are not adequate for allowing customers to browse through or buy individual goods, as the goods are typically contained within wrapping that does not allow for inspection. Further, current pallet rack systems do not provide for efficient removal of goods, as goods located on pallets that are stacked usually require the pallets stacked on top to be removed before access to the desired pallet can be obtained. In other situations, the pallets may be wrapped such that the units on the pallet do not easily fall out during the retrieval of goods using a forklift or the like.

As such, there exists a need in warehouse storage, and in particular pallet rack systems, for more efficient storage of goods that allows easy access for efficient removal of the goods.

SUMMARY OF THE INVENTION

The present invention provides the materials and methods for a warehouse storage system. Specifically, the present invention relates to a warehouse storage system for partitioning pallet racks that enhances organization and facilitates greater operational efficiency. Depending upon the organizational environment and the goods that need to be stored and organized, the warehouse storage system of the present invention can be selectively configured to occupy a variety of organizational spaces and accommodate a variety of goods.

In some aspects, the present invention provides the materials for a warehouse storage system for partitioning an existing pallet rack unit or a pallet rack system having a pallet rack unit. In some embodiments, the warehouse storage system for partitioning a pallet rack unit comprises one or more divider panels for partitioning an existing pallet rack unit into smaller compartments. For example, the warehouse storage system can comprise a plurality of divider panels to partition an existing pallet rack unit into 2, 3, 4, 5, 6, 7, 8 or more smaller sections or compartments of an existing pallet rack. In some embodiments, the divider panels can be comprised of a frame with spaced apart rungs, and in some other aspects one or more solid sheets of material. For example, the divider panels can be comprised of aluminum bars selectively configured to attach to an existing pallet rack. In some embodiments, retrofitting an existing pallet rack with the warehouse storage system of the present invention can comprise placing holes in the frame, such as horizontal support beams, of the existing pallet rack such that the divider panels can be placed in the frame of the existing pallet rack. In some embodiments, the divider panels are secured to the frame of an existing pallet rack using a slideable assembly and/or fasteners (e.g., C-clamps, zip ties, etc.).

In some embodiments, the warehouse storage system of the present invention can comprise a backing divider panel and a plurality of divider panels that operably connect to the backing divider panel at different locations along the longitudinal length of the backing divider panel. In some embodiments, the divider panels can comprise brackets on one side (e.g., C-clips) that selectively engage a bar, rung and/or frame component of the backing divider panel. In some embodiments, this type of configuration can result in smaller sections or units within a pallet rack or a single pallet rack unit. In other embodiments, the divider panels can comprise a horizontal support bar as part of the frame, such that shelving can engage the horizontal support bar of the divider panels at the same height within the pallet rack. In some aspects, the shelves further partition compartments of a pallet rack unit into smaller compartments.

In some aspects, the warehouse storage system can be assembled, without the need to retrofit an existing pallet rack. In some embodiments, the warehouse storage system can comprise at least two vertical uprights, at least two horizontal beams that span a distance between the two vertical uprights, wherein at least one of the horizontal beams contains one or more apertures, and wherein each of the divider panels are configured to operably engage at least one of the apertures of the horizontal support beams. In some embodiments, the warehouse storage device can incorporate the standard framing materials of a pallet rack system.

The flexibility and versatility exhibited by embodiments of the present invention offer many advantages, including the ability to organize and store goods in a manner that is convenient and cost-effective. Embodiments of the present invention incorporate the advantages of existing pallet rack systems and further provide a means for assessing, removing, restocking, or transporting a variety of different goods in a variety of different quantities.

BRIEF DESCRIPTION OF THE DRAWINGS

The present invention can be more completely understood in consideration of the following detailed description of various embodiments of the invention in connection with the accompanying drawings, in which.

Figure 1:
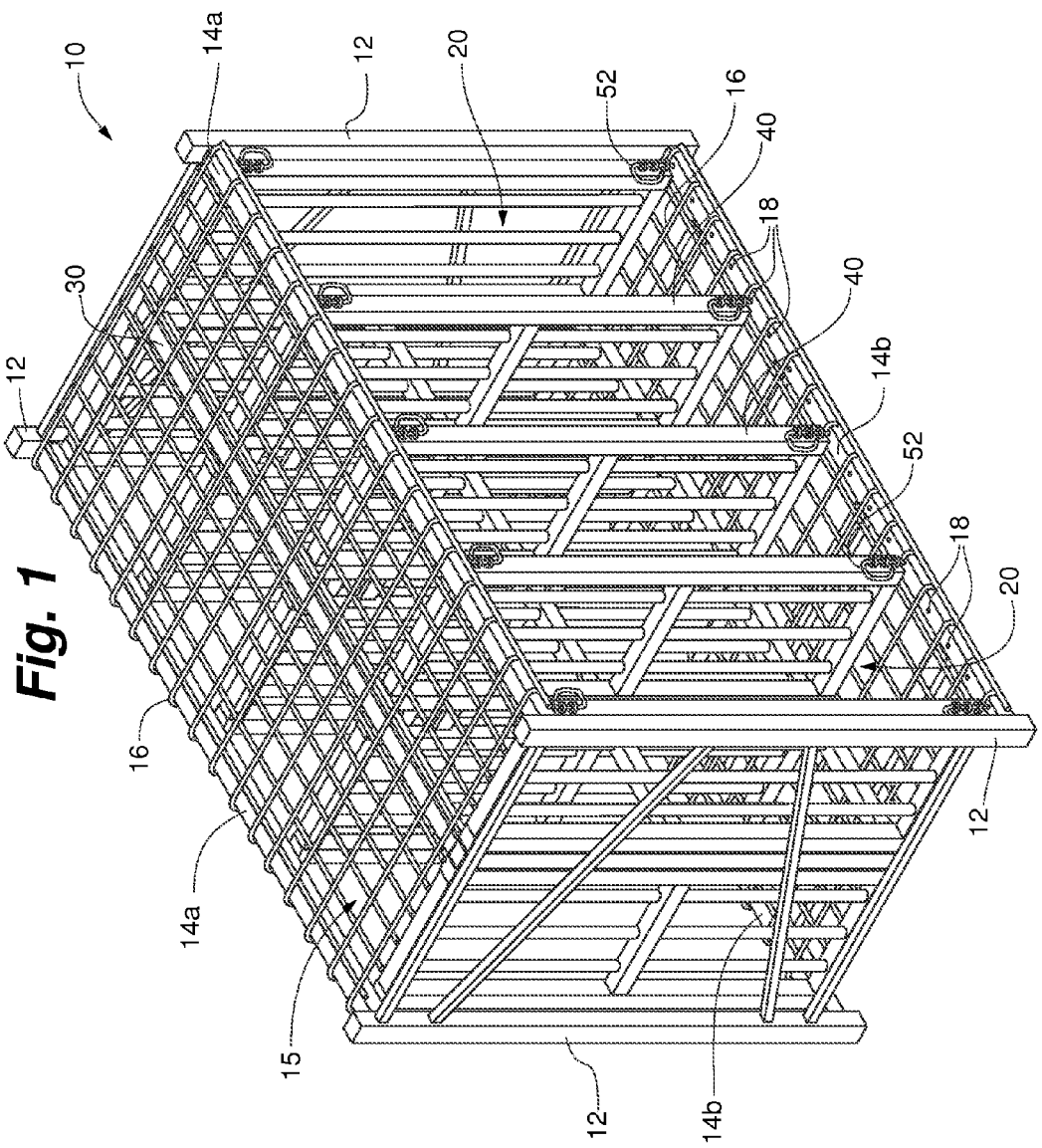
FIG. 1 is a perspective view of an assembled warehouse storage system according to certain embodiments of the present invention, the warehouse storage system having two vertical uprights operably connected by four horizontal beams to form a single pallet racking unit, the single pallet racking unit having wire decking on top of the two lower horizontal beams and wire decking on top of the two upper horizontal beams, and the single pallet racking unit divided into a front portion and a back portion by a backing divider that spans the longitudinal distance between the two vertical uprights and the vertical distance between a first plane defined by the two upper horizontal beams and a second plane defined by the two lower horizontal beams, and each of the front and back portions further divided by a plurality of divider panels operably connected to the backing divider and/or one or more of the horizontal support beams to form a plurality of separate units within the single pallet racking unit.

While the present invention is amenable to various modifications and alternative forms, specifics thereof have been shown by way of example in the drawings and will be described in detail. It should be understood, however, that the intention is not to limit the invention to the particular embodiments as described. On the contrary, the intention is to cover all modifications, equivalents, and alternatives falling within the spirit and scope of the present invention as defined by the appended claims.

DETAILED DESCRIPTION

Embodiments of the present invention are discussed in detail below. In describing embodiments, specific terminology is employed for the sake of clarity. However, the present invention is not intended to be limited to the specific terminology so selected. A person skilled in the relevant art will recognize that other equivalent parts can be employed and other methods developed without parting from the spirit and scope of the present invention.

The present invention provides the materials and methods for a warehouse storage system. Specifically, the present invention relates to a warehouse storage system for partitioning pallet racks, particularly single pallet racking units, into smaller compartments, which enhances organization and facilitates greater operational efficiency.

Figure 2:
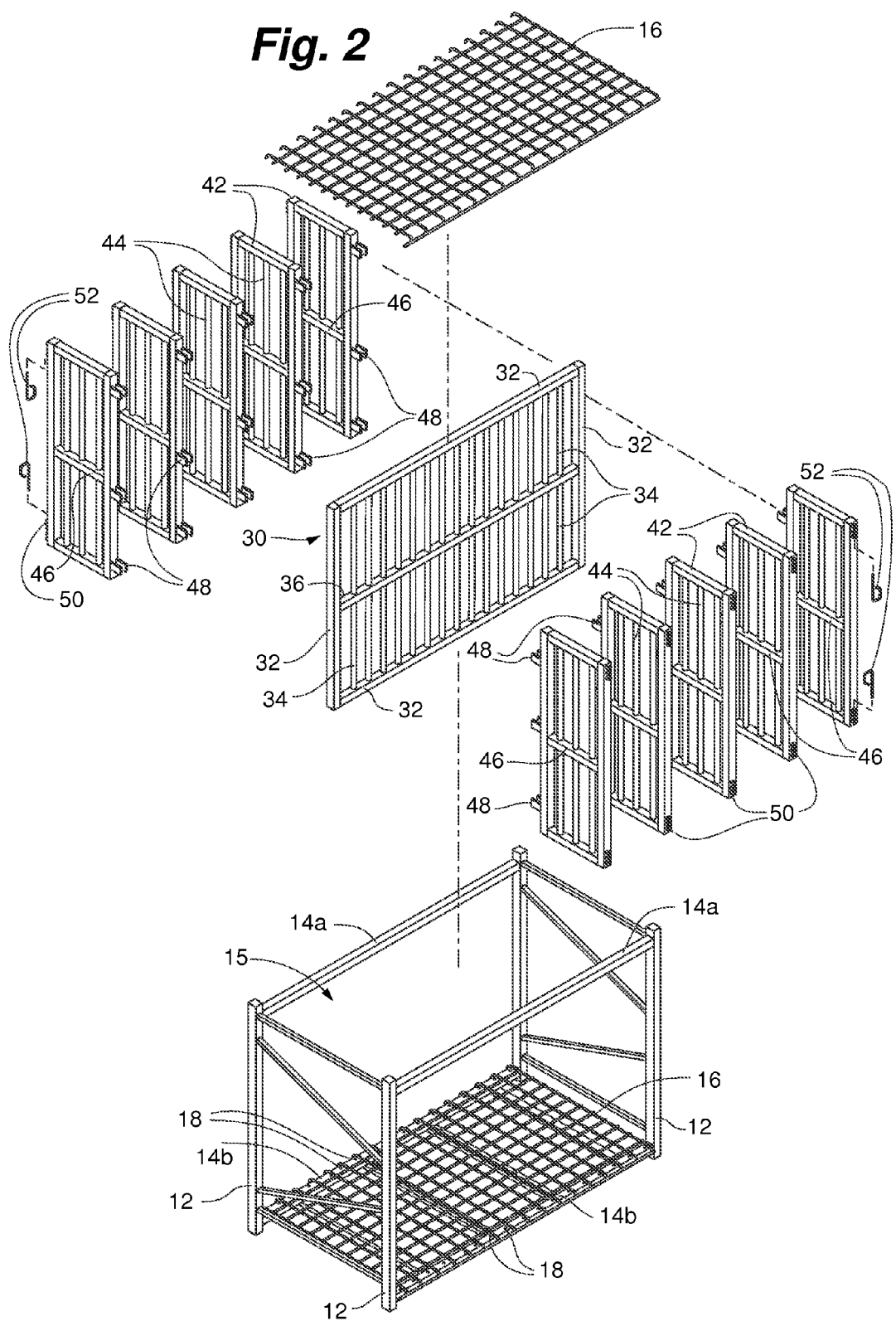
FIG. 2 is a partially exploded view of the assembled warehouse storage system of FIG. 1, the two vertical uprights, the four horizontal beams and the two wire deckings retained in an assembled configuration and illustrating the single pallet racking unit, but the backing divider and the plurality of divider panels shown in an exploded view to further illustrate the individual components and how they operably engage to partition the single pallet racking unit into compartments.

As illustrated in FIGS. 1 and 2, the present invention includes a warehouse storage system 10 illustrating a single pallet rack unit 15 further partitioned into a plurality of separate compartment units 20 within the single pallet rack unit 15 by a backing divider 30 and/or a plurality of divider panels 40.

In some aspects, multiple warehouse storage systems can be assembled to facilitate the organization and storage of many different types of goods. In some aspects, the warehouse storage system 10 can comprise a plurality of units 15, each of the units 15 partitioned into a plurality of separate compartment units 20 by a backing divider 30 and/or a plurality of divider panels 40. In some aspects, an existing pallet rack system is partitioned into smaller sections or compartments (i.e., retrofit), and in other aspects, the warehouse storage system is assembled anew. In some embodiments, the components of the warehouse storage system can be comprised of various materials, including but not limited to, steel, aluminum, metal alloys, graphite, composite material, carbon composite, plastic, synthetic polymers, and wood.

In some aspects, the warehouse storage system 10 having a single unit 15 can be assembled by connecting a first vertical upright 12 and a second vertical upright 12 by at least two horizontal beams 14, and in other aspects by at least two pairs of horizontal beams 14. One end of each of the horizontal support beams 14 operably connecting to a column on the vertical upright 12. As illustrated in FIGS. 1 and 2, each of the vertical uprights 12 has at least two vertical columns separated by a width, each of the columns operably connected to a horizontal support beam 14. In some aspects, as shown in FIGS. 1 and 2, two upper horizontal beams 14a and two lower horizontal beams 14b span a longitudinal distance between the first and second vertical uprights 12. In some other aspects (not shown), the first and second vertical uprights 12 are connected by more than two pairs of horizontal beams 14 such that the first and second vertical uprights form more than one pallet racking unit 15 in the vertical direction. For example, the first and second vertical uprights 12 can be connected by a pair of upper horizontal beams, a pair of lower horizontal beams and at least one pair of intermediate horizontal beams located between the upper and lower horizontal beams. In some aspects, there are more two or more pairs of intermediate horizontal beams located between the upper and lower horizontal beams, such that three or more pallet racking units 15 are located in the vertical direction between the upper and lower horizontal beams.

In some embodiments, each of the upper horizontal beams 14a engage the first vertical upright 12 in a position that allows for proper spacing when the divider panels and/or backing divider are placed within the single unit 15. In some aspects, the upper horizontal beams 14a can engage the first and second vertical uprights 12 in a position such that there is at least one vacant aperture, such as teardrop apertures, in the first and second vertical uprights 12, the at least one vacant aperture, located above the upper horizontal beams 14a. In some aspects, the upper horizontal beams 14a can engage the first and second vertical uprights 12 in a position such that there are two or more vacant apertures, in some aspects three or more vacant apertures, in some aspects four or more vacant apertures, in some aspects five or more vacant apertures, and in some aspects six or more vacant apertures, in the first and second vertical uprights 12 in a position located above the upper horizontal beams 14a. It shall be appreciated that the upper horizontal beams 14a are engaged to the first and second vertical supports 12 such that the height of the upper horizontal beams 14a are adjustable to the desired height of the warehouse storage system 10 and/or the desired distance off of the ground.

In some embodiments, each of the lower horizontal beams 14b engage the first vertical upright 12 in a position that allows for proper spacing when the divider panels and/or backing divider are placed within the single unit 15. In some aspects, the lower horizontal beams 14b can engage the first and second vertical uprights 12 in a position such that there is at least one vacant aperture, such as a teardrop aperture, in the first and second vertical uprights 12, the at least one vacant aperture located below the lower horizontal beams 14b. In some aspects, the lower horizontal beams 14b can engage the first and second vertical uprights 12 in a position such that there are two or more vacant apertures, in some aspects three or more vacant apertures, in some aspects four or more vacant apertures, in some aspects five or more vacant apertures, and in some aspects six or more vacant apertures, in the first and second vertical uprights 12 in a position located below the lower horizontal beams 14b. One of ordinary skill in the art will appreciate that the lower horizontal beams 14b are engaged to the first and second vertical supports 12 such that the height of the lower horizontal beams 14a are adjustable to the desired height of the single unit 15 of the warehouse storage system 10 and/or the desired distance off of the ground.

One of ordinary skill in the art will appreciate that the columns of the vertical support units 12 can each have two vertical rows of apertures, such as teardrop shaped apertures, to which protrusions on the horizontal support beams 14 operably engage to connect the vertical support units 12 separated a longitudinal distance. The vertical rows of apertures allow the horizontal support beams 14 to be operably engaged at a desired height and also allow one vertical support unit 12 to serve as a vertical upright for two different racking units 15. One of ordinary skill in the art will also appreciate that the vertical uprights 12 can have a varying width and height. In some aspects, the width between the columns of the vertical uprights between about 12 inches to about 48 inches, with a height between about 72 inches to about 144 inches. In some aspects, the longitudinal distance between the vertical uprights 12 that is spanned by the horizontal support beams 14 is between about 48 inches to about 120 inches. Other widths and heights of the foregoing is contemplated without departing from the spirit of the present invention.

In some embodiments, as shown in FIGS. 1 and 2, the warehouse storage system unit 10 can comprise one or more wire decking units 16 that may frictionally engage to the two lower horizontal beams 14b. In some embodiments, the warehouse storage system unit 10 can comprise one or more wire decking units 16 that may frictionally engage to the two upper horizontal beams 14a. In the instances of intermediate horizontal beams 14, one or more wire decking units 16 may also frictionally engage thereto.

In some embodiments, the warehouse storage system unit 10 can comprise a first wire decking unit 16 that may frictionally engages to the lower horizontal beams 14b and a second wire decking unit 16 that may frictionally engages to the upper horizontal beams 14a of the warehouse storage system. In some embodiments, the wire decking unit 16 provides a platform and supports the goods stacked in the warehouse storage system 10. One of ordinary skill in the art will appreciate that where there are multiple vertical and/or horizontal units 15, each of the units 15 may include wire decking unit 16 that operably engages the respective horizontal beams 14 on the bottom and/or top of the respective pallet rack unit 15.

In some aspects, each of the pallet rack units 15 of the warehouse storage system 10 is partitioned into additional separate compartment units 20. As illustrated in FIGS. 1 and 2, the single pallet racking unit 15 is divided into a front portion and a back portion by a backing divider 30 that may span the longitudinal distance between the two vertical uprights 12 in a horizontal direction and have a height such that the backing divider 30 spans a vertical distance located between a first plane defined by the two upper horizontal beams 14a and a second plane defined by the two lower horizontal beams 14b. In some aspects, the backing divider 30 spans the entire longitudinal distance and/or the vertical distance. In some other aspects, the backing divider 30 spans at least a portion of the longitudinal distance and/or vertical distance.

In some aspects, the backing divider 30 partitions the single pallet racking unit 15 into the front and back portions such that the front and back portions are approximately the same size. In other aspects, the backing divider 30 can be positioned such that front and back portions are partitioned into different sized portions, such that the depth from the horizontal beams 14 to the backing divider 30 are the desired depth. One of ordinary skill in the art will appreciate that the intent of using the terms "front" and "back" are merely as a point of reference and not to limit the present invention. In other aspects, more than one backing divider 30 may be positioned within the single pallet racking unit 15 such that the desired depth is obtained for both the front and back portions.

In some aspects, as shown in FIGS. 1 and 2, the backing divider 30 comprises a frame 32 having a plurality of rungs 34 vertically aligned within the frame such that the rungs 34 are substantially parallel with each other and substantially coplanar within the frame 32. In some other aspects, the plurality of rungs 34 may be horizontally aligned within the frame 32. In some embodiments, the rungs 34 of the backing divider 30 can be circular-tubular, square-tubular, flat slats, or other shape shape, such that brackets or clamps (e.g., C-clamps, C-backets, U-brackets, L-brackets) can operably engage the rungs 34. In some aspects, the backing divider 30 can comprise one or more horizontal support bars 36 that is substantially perpendicular to the rungs 34, such that shelving can operably engage the horizontal support bar 36 of the backing divider 30 at about the same height within the storage area unit 15. In some other aspects, the backing divider 30 may have one or more panels within the frame 32, while in other aspects the backing divider 30 may comprise a sheet material within the frame rather than rungs 34.

In some aspects, the rungs 34 are about 2 to about 12 inches apart, while in some preferable aspects, the rungs are about 6 inches apart.

In some aspects, as illustrated in FIGS. 1 and 2, the front and back portions can be further portioned into separate compartment units 20 by a plurality of divider panels 40 that operably connect to the backing divider 30 and/or the horizontal beams 14.

In some aspects, two or more divider panels 40 can be used to partition the front and/or back portions into the desired number of separate compartment units 20. For example, in some aspects one divider panel 40 can be used to partition the front portion into two separate compartment units 20. In some aspects, two divider panels 40 can be used to partition the front portion into three compartment units 20. In some aspects three divider panels 40 can be used to partition the front portion into four compartment units 20. As one of ordinary skill in the art will appreciate, four, five, six, seven, eight or even more compartment units 20 can be obtained by the appropriate number of divider panels 40. It shall also be appreciated that the foregoing discussion regarding the front portion is equally applicable to obtaining the desired number of compartment units 20 in the back portion. It shall further be appreciated that the desired number of compartment units 20 can be accomplished by utilizing the appropriate number of divider panels 40.

In some embodiments, the divider panels 40 can comprise a frame 42 having a plurality of individual rungs 44 vertically aligned within the frame 42 such that the rungs 44 are substantially parallel with each other and substantially co-planar within the frame 42. In some embodiments, the rungs 44 of the divider panels 40 can be circular-tubular, square-tubular, flat slats, or any other shape, such that brackets or clamps (e.g., C-clamps, C-backets, U-brackets, L-brackets) can operably engage the rungs 44. In some embodiments, the divider panels 40 can comprise one or more horizontal support bars 46 as part of the frame that is substantially perpendicular to the rungs 44, such that shelving can engage the horizontal support bar 46 of the divider panels 40 at about the same height within the storage area unit 15. In some other aspects, the divider panels 40 may have one or more panels within the frame 42, while in other aspects the backing divider 40 may comprise a sheet of material within the frame 42 rather than rungs 44.

In some aspects, the rungs 44 are about 2 to about 12 inches apart, while in some preferable aspects, the rungs are about 6 inches apart.

As best illustrated in FIG. 1, in some embodiments, the horizontal support bars 46 of the divider panels 40 can be constructed to align with the horizontal support bars 36 of the backing divider 30, thereby allowing for the installation of level shelving units (not shown) onto the support bars 36, 46 within each of the compartment units 20. In some embodiments, the lower portion of the storage area compartment 20 demarcated by the addition of shelving that engages the horizontal support bars 46 of the divider panels 40 and the horizontal support bars 36 of the backing divider 30 occupies a greater volume of space compared to the upper portion of the storage area compartment 20. In some other aspects, the support bars 36, 46 can be configured such that the upper portion and the lower portion of the compartment 20 comprise about the same volume of space when a shelving unit operably engages the support bars 36, 46. In some other aspects, the support bars 36, 46 can be configured such that the upper portion contains a greater volume of space compared to the lower portion of the compartment 20 when a shelving unit operably engages the support bars 36, 46. In some other aspects, there are two or more support bars 36, 46, such that the desired number of shelving units can be placed within each of the storage area compartments 20.

In some aspects, the divider panels 40 can operably engage the backing panel 30 by one or more brackets and/or clamps. As shown in FIGS. 1 and 2, the bracket or clamp 48 can be located on the side of the frame 42 that operably engages the backing panel 30, which facilitates the engagement of the bracket or clamp 48 with the rungs 34 of the divider panel 30. For example, as shown in FIGS. 1 and 2, each of the divider panels 40 can engage a circular-tubular shaped rung 34 of the divider panel 30 via the respective brackets 48 on the divider panels 40. In some embodiments, the bracket 48 of the divider panel 40 is offset as compared to the bracket 48 of a second divider panel 40 with which it is paired, such that both divider panels 40 on the front portion and the back portion can effectively engage the divider panel 30 at the same rung 34 without the brackets 48 of both divider panels 40 overlapping each other. In some aspects, the brackets 48 of divider panels 40 operably engage the rungs 34 of the divider panel 30 when the respective divider panel 40 is inserted within the single unit 15, such that the bracket 48 prevents the divider panel 40 from moving in the longitudinal direction between the two vertical uprights 12. In some aspects, the bracket 48 may comprise a J-shape such that the bracket 48 wraps around or at least partially around the respective rung 34 of the divider panel 40, which prevents the divider panel from moving in at least two different directions, including the longitudinal direction between the two vertical uprights 12 and a perpendicular longitudinal direction thereto, which is in the direction between the backing divider 30 and the respective horizontal beams 14.

In some aspects, as shown in FIGS. 1 and 2, divider panels 40 are also used on each end of the unit 15 proximate the vertical uprights 12. In some aspects, the divider panels 30 located on the side or end are adjacent to the vertical uprights 12. In some aspects, the divider panel 30 located on the side or end abuts the respective vertical upright 12. The divider panels 30 may be used on each end or side of the unit 15, such as to prevent product from falling out of the space provided by the frame of the vertical upright 12 and/or such that there is the same horizontal support bars 46 that can be used for shelving purposes. In some aspects, the divider panels 30 located on the side or end do not have a bracket 48; instead, an L-bracket may be fastened to the end divider panel 30 and the backing divider 40, such as being screwed into the horizontal support bars 36, 46, respectively.

In some aspects, the divider panels 30 may comprise a stability control device 50 proximately located at the interface of the divider panel 30 and the horizontal beam 14. As shown in FIGS. 1 and 2, in some aspects, the divider panel 30 comprises a stability control device 50 at the interface of the divider panel 30 at both of the interfaces with the upper and lower horizontal beams 14. In some aspects, the stability control device 50 comprises a slidable pin assembly 52 attached to the frame of the divider panel 40, wherein the slidable pin 52 can be inserted into an aperture 18 located on the horizontal beam 14. In some embodiments, the stability control device 50 can be further secured using a fastener (e.g., zip tie) to prevent the pin 52 from inadvertently disengaging with aperture 18 during normal operation.

As shown in FIGS. 1 and 2, the warehouse storage system 10 can comprise multiple stability control devices 50 located at the interfaces of the divider panels 40 and the upper horizontal beams 14a and/or lower horizontal beams 14b. In some embodiments, the apertures 18 in the horizontal beams 14 of the warehouse storage system 10 can be spaced at a desired incremental distance from each other. For example, the apertures 18 may be spaced at increments of one, inch two inches, three inches, four inches, five inches, six inches or more. In some aspects, the apertures 18 are spaced between about 1 inch increments to about 48 inch increments, in some aspects about 2 inch increments to about 36 inch increments, in some aspects about 4 inch increments to about 12 inch increments, and in some other aspects about 6 inch increments.

In some embodiments, the apertures 18 can be pre-drilled into the support beam 14 as part of the manufacturing process, and in other embodiments, the apertures 18 can be drilled into the support beam 14 or corresponding structure of an existing pallet rack (i.e., retrofitted).

In some aspects, the warehouse storage system 10 can comprise backing dividers 30, divider panels 40 and/or divider panels 40 at the end or side that can be selectively configured within a storage area unit 15 (e.g., the area of a pallet rack) such that the storage area unit 15 can be partitioned to accommodate a plurality of goods having different sizes, shapes, and dimensions. The divider panels 40 of the warehouse storage system 10 can be various heights, lengths, and widths to accommodate a plurality of goods having different sizes, shapes, and dimensions. The divider panels 40 of the warehouse storage system 10 can be selectively configured to accommodate a plurality of goods having different sizes, shapes, and dimensions by adjusting the position of the divider panels 40 in the apertures 18 of the respective horizontal support beams 14. Configured as such, the warehouse storage system 10 can be assembled with the divider components of a pallet rack system, or it can be incorporated into an existing pallet rack system as part of a retrofitting process. Configured as such, the modular aspects of the warehouse storage system 10 provide interchangeability if the components break or are damaged, as well as the ability to customize a storage area to facilitate the organization, storage, removal, restocking, and transport of a variety of goods.

In some aspects, the warehouse storage system 10 can be assembled such that a backing divider panel 30 is not provided. In this alternative embodiment, the divider panels 40 span the entire distance between the respective lower and/or upper horizontal support beams 14a, 14b. In some aspects of this alternative embodiment, the warehouse storage system 10 may also have side divider panels 40 as essentially previously described above that also span the entire distance between the respective lower and/or upper horizontal support beams 14a, 14b.

In some other aspects, the single pallet racking unit 10 is divided into a front portion and a back portion by a backing divider 30 that spans at least a portion of a longitudinal distance between the two vertical uprights 12 in a horizontal direction and at least a portion of a vertical distance that spans the distance between a first plane defined the two upper horizontal beams 14a and a second plane defined by the two lower horizontal beams 14b. One or more divider panels 40 may then operably engage the backing divider 30 to provide compartments 20 with the desired size. It should be appreciated that in the instance where the backing divider 30 does not span the entire longitudinal distance between the two vertical uprights 12, one or more of the divider panels 40 and the depth of the respective compartments 20 may span the entire distance between the respective horizontal beams 14. Similarly, where the backing divider 30 does not span the entire height between the upper and lower horizontal beams 14, one or more of the compartments 20 may have a depth that spans the entire distance between the respective horizontal beams 14. Accordingly, storage area unit 15 may be divided into compartments 20 that are of varying widths, heights and/or depths according to the present invention.

In some aspects, the warehouse storage system 10 can be assembled according to a specific set of instructions. For example, the assembly of the warehouse storage system 10 can comprise instructions to attach the lower support beams 14b to the desired position on the vertical uprights 12. The assembly of the warehouse storage system 10 can also comprise instructions to attach the upper support beams 14a to the vertical uprights 12 at a desired height above the lower support beams 14b. The attachment of one or more of the lower support beams 14b can be accomplished before or after the attachment of one or more of the upper support beams 14a. But once the lower and upper support beams 14 are attached to the vertical uprights 12, such a configuration provides the single unit 15 and provides proper spacing for the addition of the divider panels 40 and/or backing divider 30.

Next, assembly instructions of the warehouse storage system 10 can comprise the instruction to attach wire decking 16 on top of the upper support beams 14a and/or lower support beams 14b. The wire decking may frictionally engage the respective support beams 14. To the extent it is desired to divide the single unit 15 into a front and back portion, assembly instructions of the warehouse storage system 10 may comprise an instruction for the addition of at least one backing divider 30 within the inner area of the single unit 15 to divide the single unit 15 into a front portion and a back portion having the desired depths.

Next, assembly instructions of the warehouse storage system 10 can comprise an instruction for the addition of one or more divider panels 40 into the front and/or back portions of the storage area unit 15, such that the divider panels 40 are substantially perpendicular to the backing divider 30. In some aspects, at least one pair of divider panels 40 are inserted within the storage area unit 15 and operably engage the backing divider 30, such that the backing divider 30 is located between each pair of divider panels 40. In some aspects, one or more divider panels 40 are inserted within the storage area unit 15 and operably engage the backing divider 30 to provide the desired compartment units 20. In some aspects, the assembly instructions provide for the divider panels 30 to be secured to the backing divider 30 by one or more brackets or clamps 50 located on the divider panels 30 on the side that operably engages the backing divider 30. In instances where one or more pairs of divider panels 40 are inserted within the storage area unit 15 such that the backing divider 30 is located therebetween, the brackets or clamps 50 are configured on the respective divider panels 40 such that the divider panels 40 can effectively engage the backing panel 30 at non-overlapping points.

Next, assembly instructions of the warehouse storage system 10 can comprise further engaging a stability control device 50 on the divider panels 40. In some aspects, engaging the stability control device 50 includes inserting a slideable pin 52 within an aperture 18 located in the respective horizontal support beam 14. Engaging the stability control device 50 may also include securing the stability control device 50 with a fastener, such as zip ties, such as to help prevent the slideable pin 52 from disengaging from the aperture 18.

Next, assembly instructions of the warehouse storage system 10 can comprise the addition of one or more divider panels 40 at proximate the vertical uprights 12, the side divider panels 30 operably engaging the backing divider 30. Next, assembly instructions of the warehouse storage system 10 can comprise securing the side divider panels 40 to the backing divider 30 using a bracket, such as an L-bracket with fasteners. Configured as such, the warehouse storage system 10 having a previously single unit 15 can be partitioned into two or more compartment units 20 for optimal use.

In the alternative embodiment where a backing divider 30 is not utilized, the divider panels 40 would be inserted within the pallet racking unit 15 to span the entire distance between the respective lower and/or upper horizontal support beams 14.

Although the present invention has been described with reference to the presently preferred embodiments, it should be understood that various modifications can be made without departing from the spirit of the present invention. Accordingly, the present invention is limited only by the following claims.

What is claimed is:

1. A pallet rack system comprising:
a first vertical upright unit located within a first vertical plane and a second vertical upright unit located within a second vertical plane, each of the first and second vertical upright units having a first vertical column and a second vertical column spaced apart a first distance within the respective first and second vertical planes, each of the first and second vertical columns having a plurality of apertures; the first and second vertical upright units spaced apart a longitudinal distance.
a first pair of horizontal support beams located within a first horizontal plane, each of the first pair of horizontal support beams having a first end operably connected to the first vertical upright unit by engaging at least one of the plurality of apertures on the respective first and second vertical columns of the first vertical upright, each of the first pair of horizontal support beams having a second end operably connected to the second vertical upright unit by engaging at least one of the plurality of apertures on the respective first and second vertical columns of the second vertical upright, wherein the first pair of horizontal support beams are height adjustable within the plurality of apertures of the respective first and second vertical columns on each of the first and second vertical upright units;
a second pair of horizontal support beams located within a second horizontal plane, each of the second pair of horizontal support beams having a first end operably connected to the first vertical upright unit by engaging at least one of the plurality of apertures on the respective first and second vertical columns of the first vertical upright at a vertical distance located above the first ends of the first pair of horizontal support beams, each of the second pair of horizontal support beams having a second end operably connected to the second vertical upright unit by engaging at least one of the plurality of apertures on the respective first and second vertical columns of the secondt vertical upright at the vertical distance located above the second ends of the first pair of horizontal support beams, such that the second horizontal plane is located the vertical distance above the first horizontal plane, wherein the second pair of horizontal support beams are height adjustable within the plurality of apertures of the respective first and second vertical columns on each of the first and second vertical upright units;
a backing divider having a rectangular frame and a plurality of rungs within the rectangular frame, the backing divider located between the first and second vertical upright units and the first and second horizontal support beams, the backing divider located within a third vertical plane that is substantially perpendicular to both of the first and second vertical planes and the first and second horizontal planes, the backing divider forming a front portion and a back portion; and
at least one divider panel having a rectangular configuration operably connected to at least one of the rungs of the backing divider and to at least one of the horizontal support beams of the pair of horizontal support beams, the at least one divider panel located within the front portion defined by the back divider and within a fourth vertical plane that is substantially perpendicular to the third vertical plane of the backing divider, the at least one rectangular divider panel operably connected to the backing divider and the at least one of the horizontal support beams defining a partition within the front portion forming at least two separate compartment units within the front portion.

2. The pallet rack system of claim 1, wherein the at least one divider panel is operably connected to one of the horizontal support beams of the first pair of horizontal support beams.

3. The pallet rack system of claim 2, further comprising an aperture located in the horizontal support beam of the first pair of horizontal support beams, and wherein the at least one divider panel further comprises a slideable pin assembly that operably engages the aperture in the horizontal support beam of the first pair of horizontal support beams.

4. The pallet rack system of claim 3, the at least one divider panel further operably connected to one of the horizontal support beams of the second pair of horizontal support beams.

5. The pallet rack system of claim 4, further comprising an aperture located in the horizontal support beam of the second pair of horizontal support beams, and wherein the at least one divider panel further comprises a slideable pin assembly that operably engages the aperture in the horizontal support beam of the second pair of horizontal support beams.

6. The pallet rack system of claim 1, further comprising a plurality of divider panels located in the front portion operably connected to the backing divider.

7. A pallet rack system comprising:
a first vertical upright unit and a second vertical upright spaced apart a longitudinal distance, each of the first and second vertical upright units having a plurality of apertures spanning at least a portion a vertical height of the first and second vertical upright units;
a first pair of horizontal support beams and a second pair of horizontal support beams, each of the first and second pair of horizontal support beams having a first end operably connected to the first vertical upright unit by engaging at least one of the plurality of apertures on the respective first and second vertical upright units, and each of the first pair of horizontal support beams having a second end operably connected to the second vertical upright unit by engaging at least one of the plurality of apertures on the respective first and second vertical upright units, the second pair of horizontal support beams operably connected to the first and second vertical upright units a vertical distance above the first pair of horizontal support beams by engaging at least one of the plurality of apertures on the respective first and second vertical upright units, the first and second horizontal support beams adjustable within the plurality of apertures to provide a desired height between the first and second horizontal support beams, the first and second pair of horizontal support beams spanning the longitudinal distance, and the first and second vertical upright units and the first and second pair of horizontal support beams defining an interior pallet rack unit area;

a backing divider having a rectangular frame and a plurality of rungs within the rectangular frame, the backing divider located within the interior pallet rack unit area in a substantially vertical plane that is substantially perpendicular to the first and second vertical upright units, the backing divider forming a front interior pallet rack unit area and a back interior pallet rack unit area; and at least one divider panel having a rectangular configuration located in the front interior pallet rack unit area operably connected to at least one of the rungs of the backing divider and at least one of the horizontal support beams of the first or second pair of horizontal support beams defining a vertical partition, such that the front interior pallet rack unit area is partitioned into at least two separate compartments, the at least two separate compartments each having an area smaller than the front interior pallet rack unit area.

8. The pallet rack system of claim 7, wherein the at least one divider panel is operably connected to one of the horizontal support beams of the first pair of horizontal support beams.

9. The pallet rack system of claim 8, further comprising an aperture located in the horizontal support beam of the first pair of horizontal support beams, and wherein the at least one divider panel is operably connected to the at least one of the first pair of horizontal support beams by a slideable pin assembly that operably engages the aperture in the horizontal support beam.

10. The pallet rack system of claim 7, wherein the at least one divider panel is operably connected to one of the horizontal support beams of the second pair of horizontal support beams.

11. The pallet rack system of claim 10, further comprising an aperture located in the horizontal support beam of the second pair of horizontal support beams, and wherein the at least one divider panel is operably connected to the at least one of the first pair of horizontal support beams by a slideable pin assembly that operably engages the aperture in the horizontal support beam.

12. The pallet rack system of claim 7, further comprising a plurality of divider panels located in the front interior pallet rack unit area operably connected to the backing divider.

13. An apparatus for partitioning an interior area of a pallet rack unit, the pallet rack unit defined by a first vertical upright unit spaced a longitudinal distance from a second vertical upright unit, each of the first and second vertical upright units having a plurality of apertures spanning at least a portion a vertical height of the first and second vertical upright units, the first and second vertical upright units operably connected to a first pair of horizontal support beams that span the longitudinal distance by the each of the first pair of horizontal support beams engaging at least one of the plurality of apertures on the respective first and second vertical upright units, and the first and second vertical upright units operably connected to a second pair of horizontal support beams that span the longitudinal distance by the each of the second pair of horizontal support beams engaging at least one of the plurality of apertures on the respective first and second vertical upright units, wherein the second pair of horizontal support beams are adjustable within the plurality of apertures and located a vertical distance above the first pair of horizontal support beams, the apparatus comprising:

a backing divider having a rectangular frame and a plurality of rungs within the rectangular frame, the backing divider located within the interior area of the pallet rack unit in a substantially vertical plane that is substantially perpendicular to the first and second vertical upright units, the backing divider defining a front interior area and a back interior area; and at least one divider panel having a rectangular configuration located in the front interior area, the at least one divider panel operably connected to at least one rung of the backing divider and at least one of the horizontal support beams of the first or second pair of horizontal support beams defining a vertical partition; wherein the front interior area is partitioned into at least two separate compartments, the at least two separate compartments each having an area smaller than the front interior area.

14. The apparatus of claim 13, wherein the at least one divider panel further comprises a first slideable pin assembly and one of the horizontal support beams of the first pair of horizontal support beams comprises an aperture, wherein the first slideable pin assembly is operably connected to the aperture in one of the horizontal support beams of the first pair of horizontal support beams.

15. The apparatus of claim 14, wherein the at least one divider panel further comprises a second slideable pin assembly and one of the horizontal support beams of the second pair of horizontal support beams comprises an aperture, wherein the second slideable pin assembly is operably connected to the aperture in one of the horizontal support beams of the second pair of horizontal support beams.

16. The apparatus of claim 15, wherein the at least one divider panel comprises a bracket that is operably connected to the backing divider.

17. The apparatus of claim 16, wherein the backing divider comprises a vertical bar and the bracket operably engages the vertical bar of the backing divider.

18. The apparatus of claim 13, further comprising a plurality of divider panels located in the front interior area operably connected to the backing divider.

19. The apparatus of claim 18, wherein the back divider comprises at least one vertical bar and each of the plurality of divider panels each have a bracket that operably engages the at least one vertical bar of the backing divider.

20. The apparatus of claim 18, wherein at least one of the plurality of divider panels is located proximate the first vertical upright unit.

* * * * *